(12) United States Patent
Ma

(10) Patent No.: US 7,255,600 B2
(45) Date of Patent: Aug. 14, 2007

(54) MODULE ASSEMBLY AND EQUIPMENT FOR FITTING THE SAME

(75) Inventor: Wen-Qiang Ma, ShenZhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/322,414

(22) Filed: Dec. 30, 2005

(65) Prior Publication Data
US 2007/0037448 A1    Feb. 15, 2007

(30) Foreign Application Priority Data
Aug. 11, 2005    (CN)    ................. 2005 2 0074502

(51) Int. Cl.
*H01R 13/648* (2006.01)
(52) U.S. Cl. .................................... 439/607
(58) Field of Classification Search ............. 439/607, 439/108, 67, 495; 257/432, 771, 678; 348/335, 348/374, 340; 385/92; 338/197; 360/97.1, 360/98.1
See application file for complete search history.

(56) References Cited

U.S. PATENT DOCUMENTS

| | | | |
|---|---|---|---|
| 6,483,711 B1 * | 11/2002 | Huang | 361/736 |
| 6,862,804 B2 | 4/2004 | Nishio | |
| 6,729,905 B1 * | 5/2004 | Hwang | 439/607 |
| 2004/0240004 A1 * | 12/2004 | Ching | 358/513 |

* cited by examiner

*Primary Examiner*—Alexander Gilman
(74) *Attorney, Agent, or Firm*—Wei Te Chung

(57) ABSTRACT

A module assembly (100) comprises a module body (2) with a plurality of conductive pads (210) thereof, a FPC (3) with a plurality of conductive strips (310) in one end and a metal shell (1). The shell has a planar bottom wall (11) and sidewalls (12,13,14) approximately extending from edges of the bottom wall forming a room to receive the FPC and the module body. Sidewalls define arms of two types extending therefrom. The arms (123,131,141) of first type slant into the room to retain the module body and the arms (122) of second type slant outwards and away from the room to retain the module assembly. And the module assembly is fitted into an electronic equipment (300).

14 Claims, 7 Drawing Sheets

MODULE ASSEMBLY AND EQUIPMENT FOR FITTING THE SAME

BACKGROUND OF THE INVENTION

1. Field of the Invention

The present invention generally relates to a module assembly having a module body such as a camera module and a Flat Printed Circuit (FPC) electrically connected together, and an equipment to which the module assembly is firmly fitted.

2. Description of Related Arts

With development of electronic equipments, such as cellular mobile phones, PDAs or the likes, a lot of additional functions such as taking pictures etc. are added to the equipments. In the beginning, camera modules generally are furnished on the PCB or FPC by directly soldering, which make the camera module unchanged and might damage the camera module. Therefore, a module connector connecting the camera module and a PCB appears, which overcomes said questions.

U.S. Pat. No. 6,862,804 discloses a module connector, which is used to connect a camera module to a FPC. The connector includes a dielectric housing of a hollow solid structure and a plurality of contacts received in corresponding upright passageways on four inner side walls of the housing. First, solder tails of the contacts are soldered to strips on the FPC, and then the camera module is assembled to the dielectric housing with its conductive pads electrically connecting to another ends opposite to the solder tails of the contacts. Thus, electrical connection is established between the camera module and the FPC. But, the dielectric housing will occupies space of the equipment and make against miniaturization of equipment.

Hence, an improved module assembly is required to overcome the aforesaid disadvantages of the prior art.

SUMMARY OF THE INVENTION

It is an object of the present invention to provide a module assembly, which receives a module body and an FPC by a shell.

It is another object of the present invention to provide equipment assembling the module assembly, where the module assembly can assemble into and un-assemble from the equipment easily.

In order to achieve the above-mentioned one object, a module assembly comprises a module body with a plurality of conductive pads thereof, an FPC with a plurality of conductive strips on one end and a metal shell. The shell has a planar bottom wall and sidewalls approximately extending from edges of the bottom wall forming a room to receive the FPC and module body. Sidewalls define arms of two types extending therefrom. The arms of the first type slant into the room to retain the module body and the arms of the second type slant outwards and away from the room.

In order to achieve the above-mentioned another object, an equipment for fitting a module assembly comprises a module assembly, an insulative periphery, and a PCB. The module assembly comprises a module body, an FPC and a metal shell having a room for receiving the module, the FPC being sandwiched between the module body and the shell. The metal shell has at least one module-locking arm slanting into the room to retaining the module body and a board-locking arm slant apart from the room. The PCB is movably assembled into the insulative periphery and has an open. The assembly passes through the open and is accommodated an assembly-receiving room formed between the PCB and the periphery with the board-locking arms pressing against the PCB.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
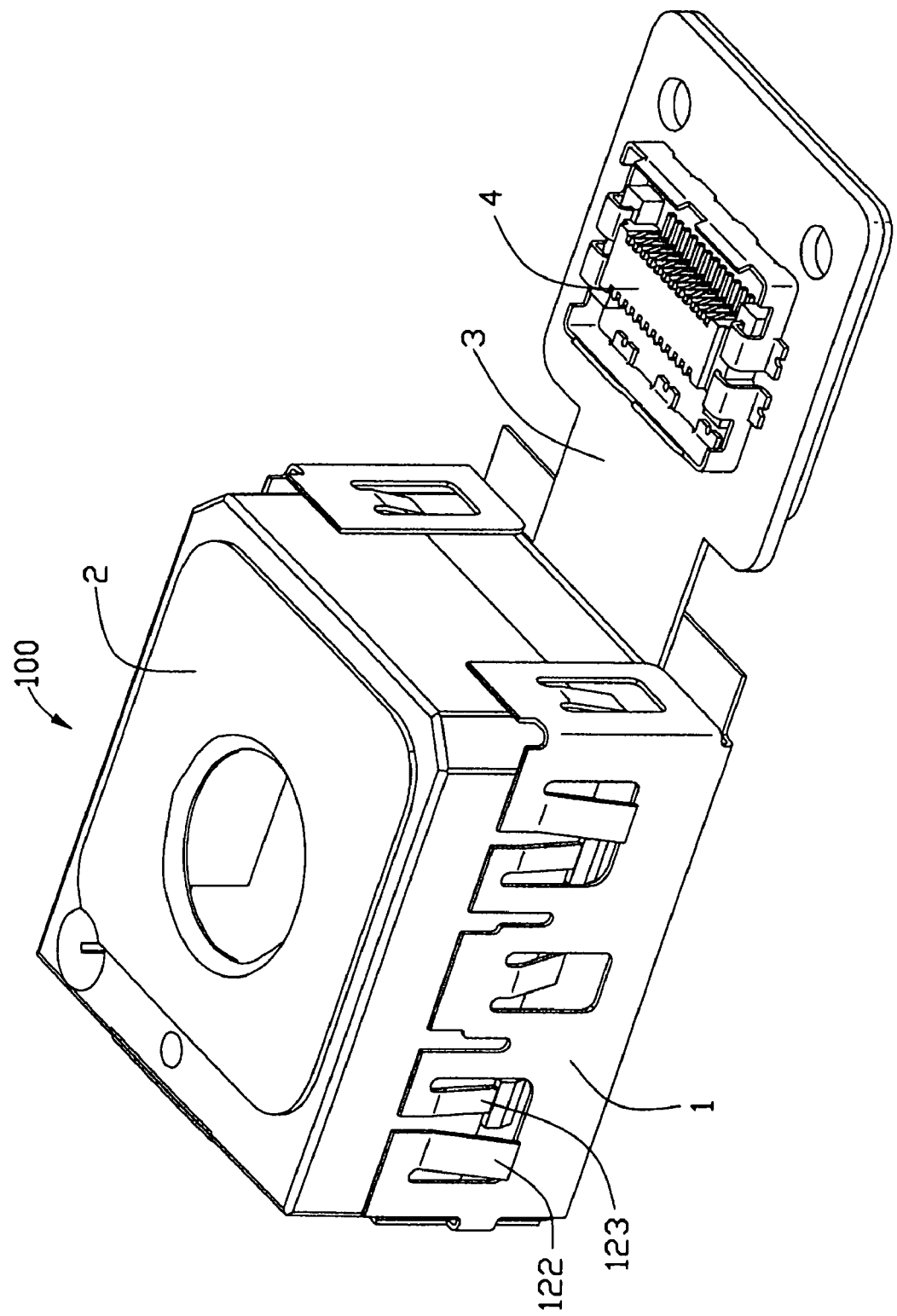
FIG. 1 is a perspective view of a module assembly in accordance with the present invention.

Reference will now be made to the drawing figures to describe the present invention in detail.

Figure 5:
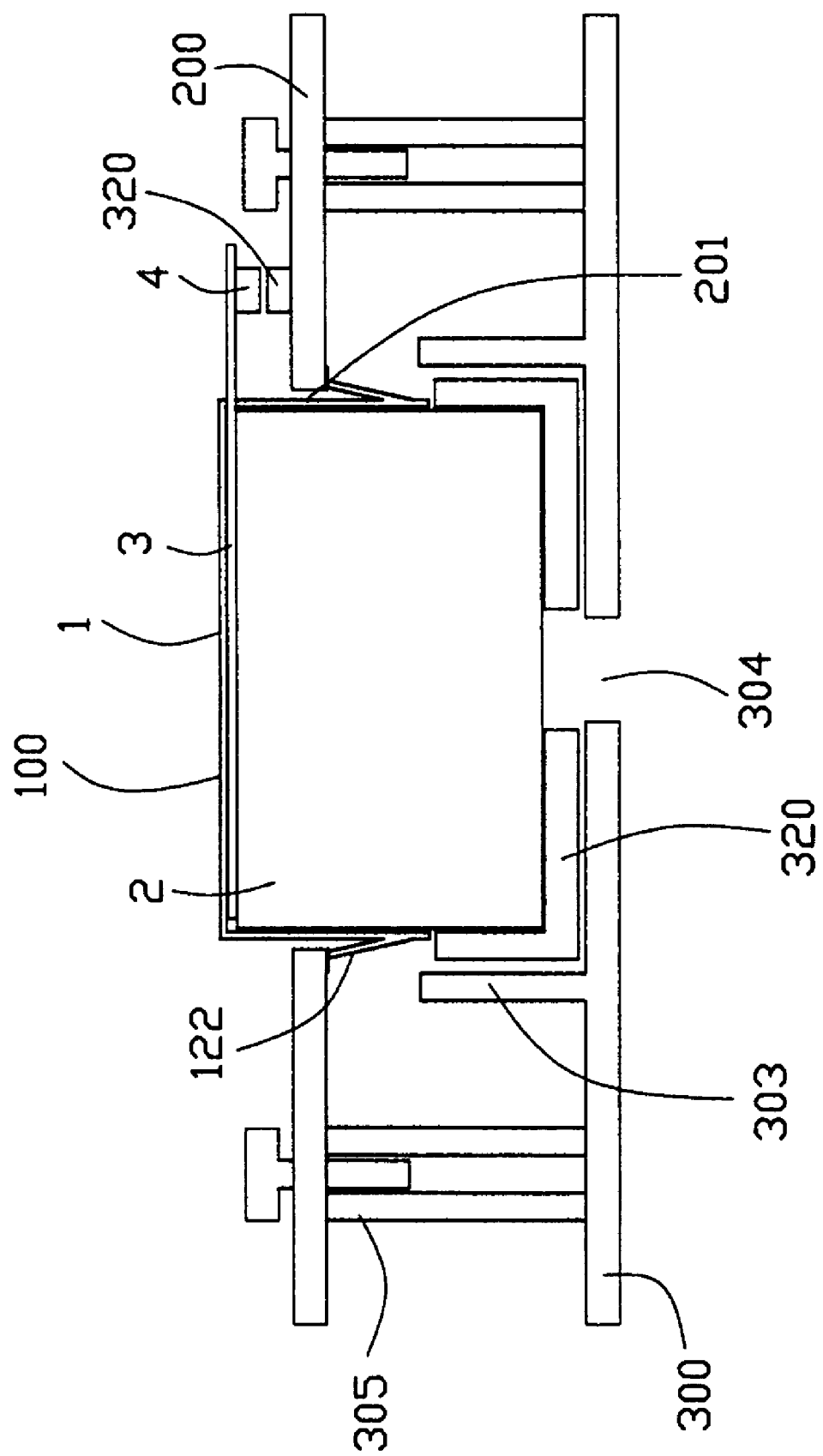
FIG. 5 is a sketch view of the module assembly completely fitted into the equipment.

Referring to FIGS. 1 and 5, a module assembly 100 in accordance of the present invention is adapted for electrically connecting a module body such as a camera module 2 to an electronic equipment such as cellular mobile phones 300 (only showing sketch map) in virtue of an FPC 3. The module assembly 100 is assembled into the electronic equipment 300 and electrically connects a PCB 200 in the equipment, which will be further described hereinafter. In fact, the module assembly 100 may also be used for other kinds of electronic equipment in other embodiments.

Referring to FIGS. 1, the module assembly 100 includes a shell 1 made of metal. The camera module 2 is received in the shell and the FPC 3 is connected to the camera module 2 with its one end and has a BTB (Board-to-Board) connector 4 which disposed on another end.

Figure 2:
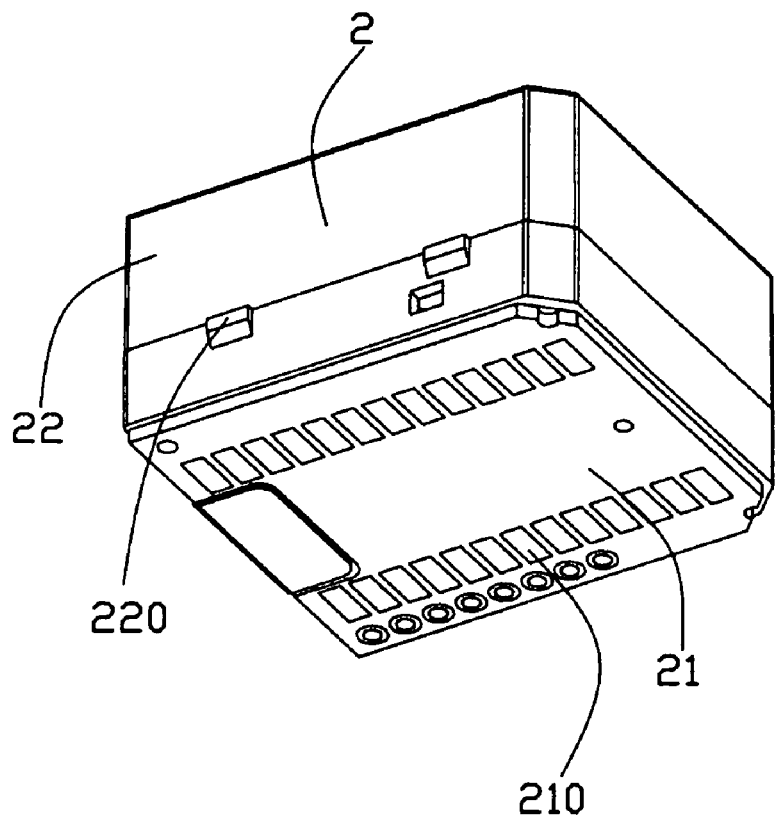
FIG. 2 is a perspective view of the module body and the FPC shown in FIG. 1.
Figure 2:
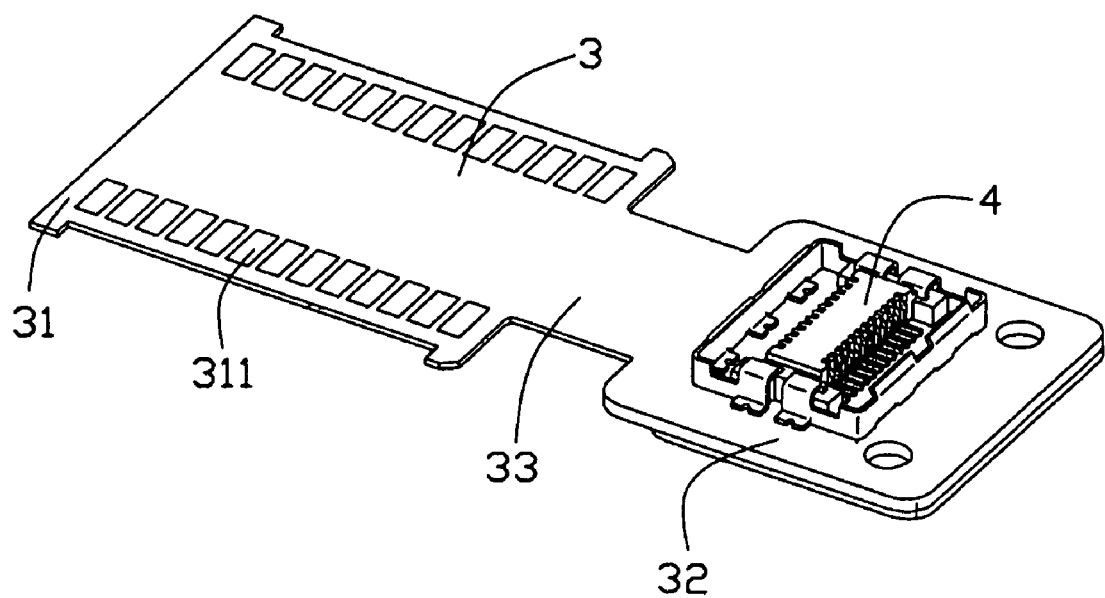

Referring to FIG. 2, the camera module 2 is of a box-like body, and defines two rows of conductive pads 210 in its bottom surface 21 and ribs 220 projecting from its opposite side surfaces 22. The FPC 3 includes a first end potion 31, a second end portion 32 and a connecting portion 33 connecting the first and second end portions 31, 32 together. The first end portion 31 has two rows of conductive strip 310 corresponding to the conductive pad 220 on the camera module 2. The BTB connector 4 is arranged on the second end portion 32 on the same side to the strips 310, which is a conventional connector and not be described herein. The connecting portion 33 is smaller than the first and second end portions 31,32 in transversal width. The FPC 3 is connected to the camera module 2 by soldering the strips 310 to the pads 220, as shown in FIG. 3.

Figure 3:
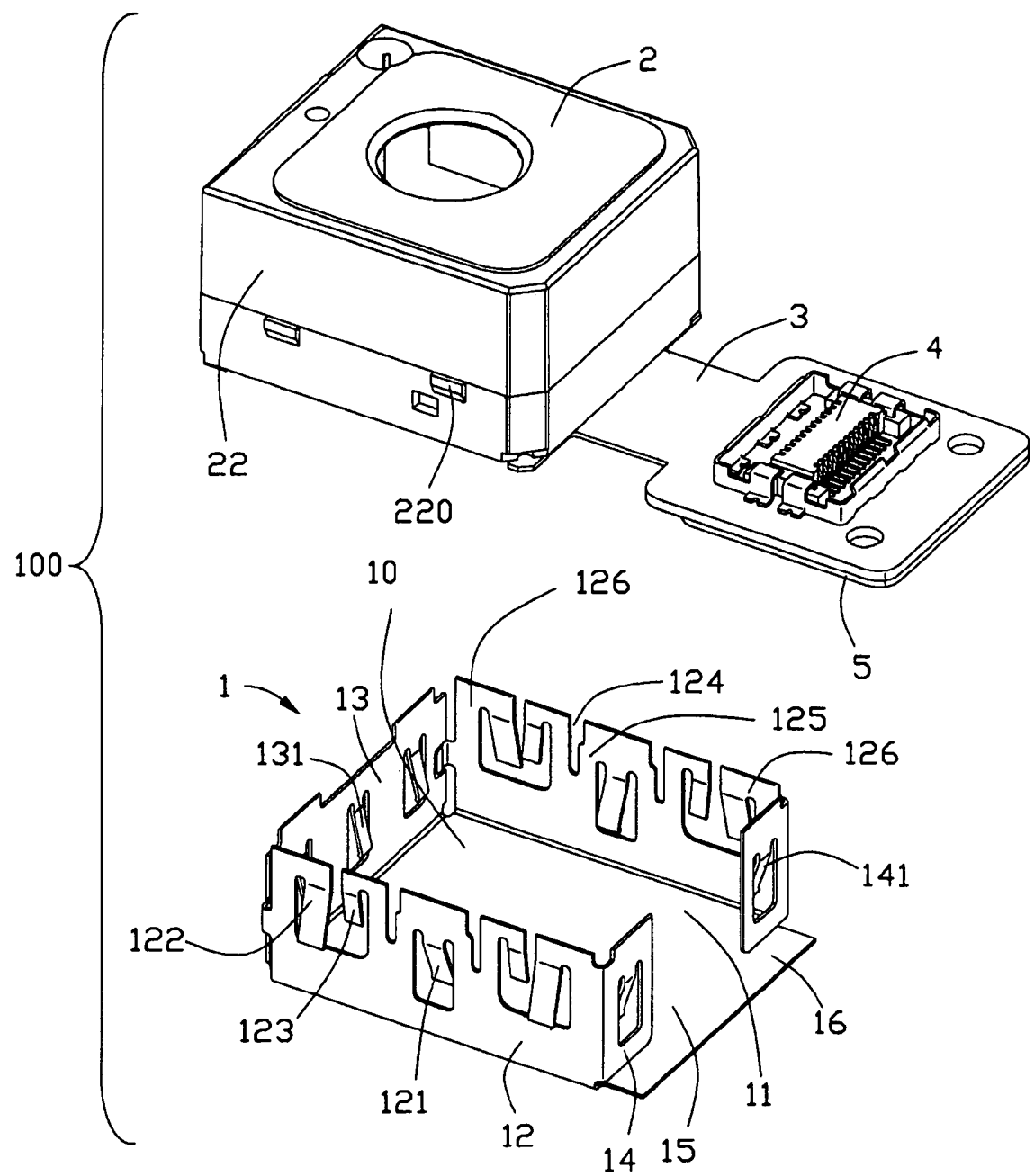
FIG. 3 is a partly exploded perspective view of the module assembly in FIG. 1.

Referring to FIG. 3, the shell 1 is stamped from a metal sheet and includes a planar bottom portion 11 and three sidewalls extending upright from side fringes of the bottom portion 11 respectively, namely, a front and back wall 12 opposite to each other, and a left wall 13. Two face-to-face right walls 14 extend from right fringes of the front and back walls 12 and space from each other for forming a gateway 15. The bottom base portion 11 is beyond the right walls 14 for forming an extending portion 16 which will be described hereinafter. Said walls all electrically and mechanically connect each other to form a room 10 served as receiving the module body or the camera module 2, namely camera-receiving room, and protecting the camera module 2 from EMI.

Since the back wall 12 is essentially similar to the front wall in configuration, only the front wall 12 is discussed in detail herein. The front wall 12 includes three portions defined by two slots 124, namely a middle portion 125 and two side portions 126 disposed beside the middle portion 125. The middle portion 124 defines a flat arm 121 slanting inwardly from its upper portion toward the camera-receiving room 10, which is used to lock the camera module and named as first camera-locking member. Each side portion 126 also define a flat arm 123 slanting inwardly from its upper portion towards the camera-receiving room 10, which is also used to lock the camera module and named as second camera-locking member, and another flat arm 122 slanting outwardly from its upper portion and away from the camera-receiving room 10 which is used to retain the module assembly 100 in the equipment, named as assembly-locking arm. The two arms 122, 123 are separate and independent from each other and the assembly-locking arm 122 is longer than the second camera-locking arm 123. The left and right walls 13,14 each defines third camera-locking arms 131,141 inclining inwardly, which similar to the first and second camera-locking arms 121, 123.

Place the camera module 2 with the FPC 3 into camera-receiving room 10 of the shell 1 from up-to-down direction. The second camera-locking arms 123 bear against the ribs 220 and the first and third camera-locking arms 121,123,141 resiliently abut against the camera module's sidewall to retain the camera module 2 in the room. The connecting portion 33 is though the gateway 15. Thus, the module assembly 100 is assembled.

Figure 4:
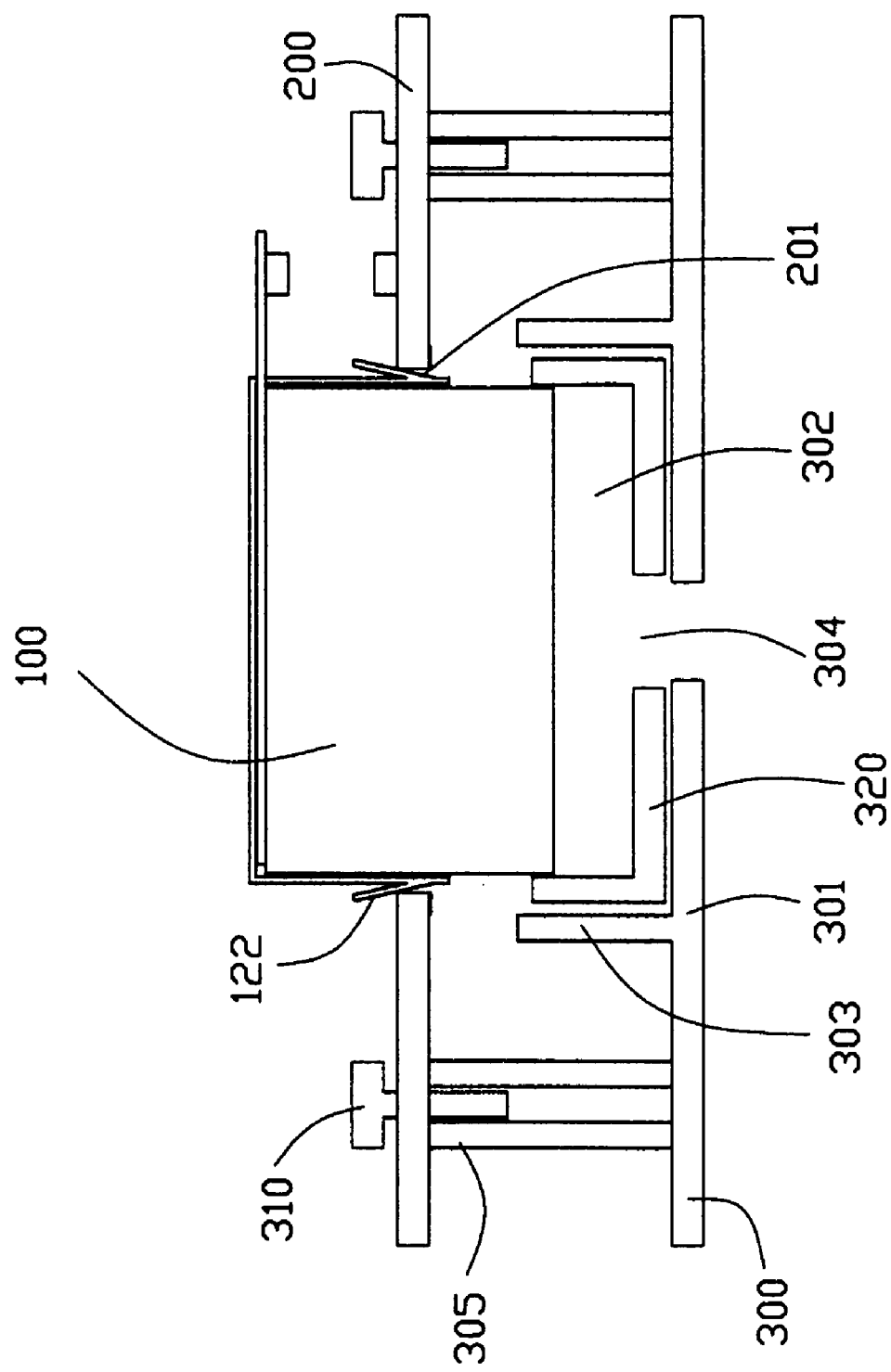
FIG. 4 is a sketch view of the module assembly non-completely fitted into an equipment.

Then, the module assembly 100 is fixed into the electronic equipment 300, FIG. 4 and 5 showing the assembly process. The equipment 300 includes a periphery 301 made of insulative material. The periphery 301 defines a pair of stop portion 303 and a pair of fasten portion 305 which both perpendicularly extending therefrom to the inside of the equipment. The fasten portion 305 is disposed outer and longer than the stop portion 303. The PCB 200 is fixed to the equipment 300 by a fastener 310, such as a threat, tying down the PCB and the fasten portion 305. Thus the PCB is movable fixed to the equipment 300 and a room among the PCB, stop portion 303 and the periphery is formed. And a pair of inverted L-shaped washers 320, such as rubber bands, is disposed in joint of the stop portion 303 and periphery 301. The PCB further defines an open 201 corresponding to the room. In best embodiment, the width of the open 201 is slight larger than that between the two stop portions 303, but slight smaller than that between the two fasten portions 305, thus the module assembly 100 can move slightly in right-left direction. And a hole 304 is defined in periphery 301 to communicate with space between the two washers 320 and the room. Thus a room 302 receiving the module assembly 100, namely assembly-receiving room, is formed.

As shown in FIG. 4, the module assembly 100 is inserted into the assembly-receiving room 302 with its top side downwards through the opening 201 of the PCB. And the outwards slanting assembly-locking arms 122 move inwards until the assembly 100 is completely received in the assembly-receiving room 302. Then the arms 122 deflect outwards and press against the PCB along the open 21, as shown in FIG. 5. At the same time, the washers 320 resiliently deflect and urge the module assembly 100 upwards. Thus, the assembly 100 is retained in the room 302. The fastener 310 can adjust the camera-receiving room to adapt the assembly 100. And then mate the BTB connector 4 on the FPC with a mating BTB connector 320 to establish electrical connection between the module assembly 100 and the electronic equipment 300.

Figure 6:
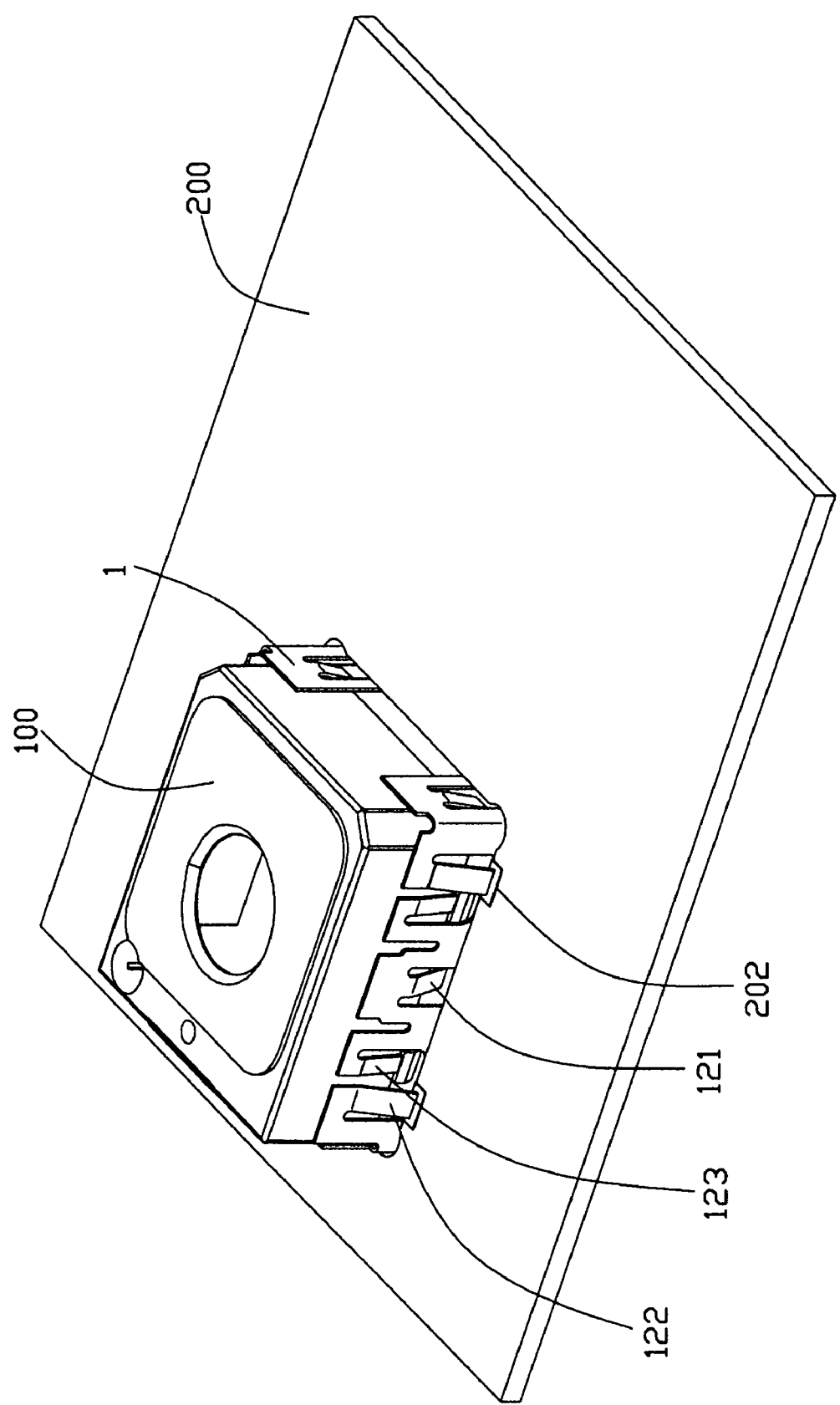
FIG. 6 is a perspective view of the module assembly assembled on a PCB in the equipment.

FIG. 6 shows the disposition of the module assembly 100 and the PCB 200. The PCB 200 can further have a conductive pads 202 corresponding to the assembly-locking members 122, the pads being connecting with the ground trace. So, board-locking members 122 also complete ground function. The free end of the board-locking members 122 is smooth arc to avoid scratching the pads 202.

Figure 7:
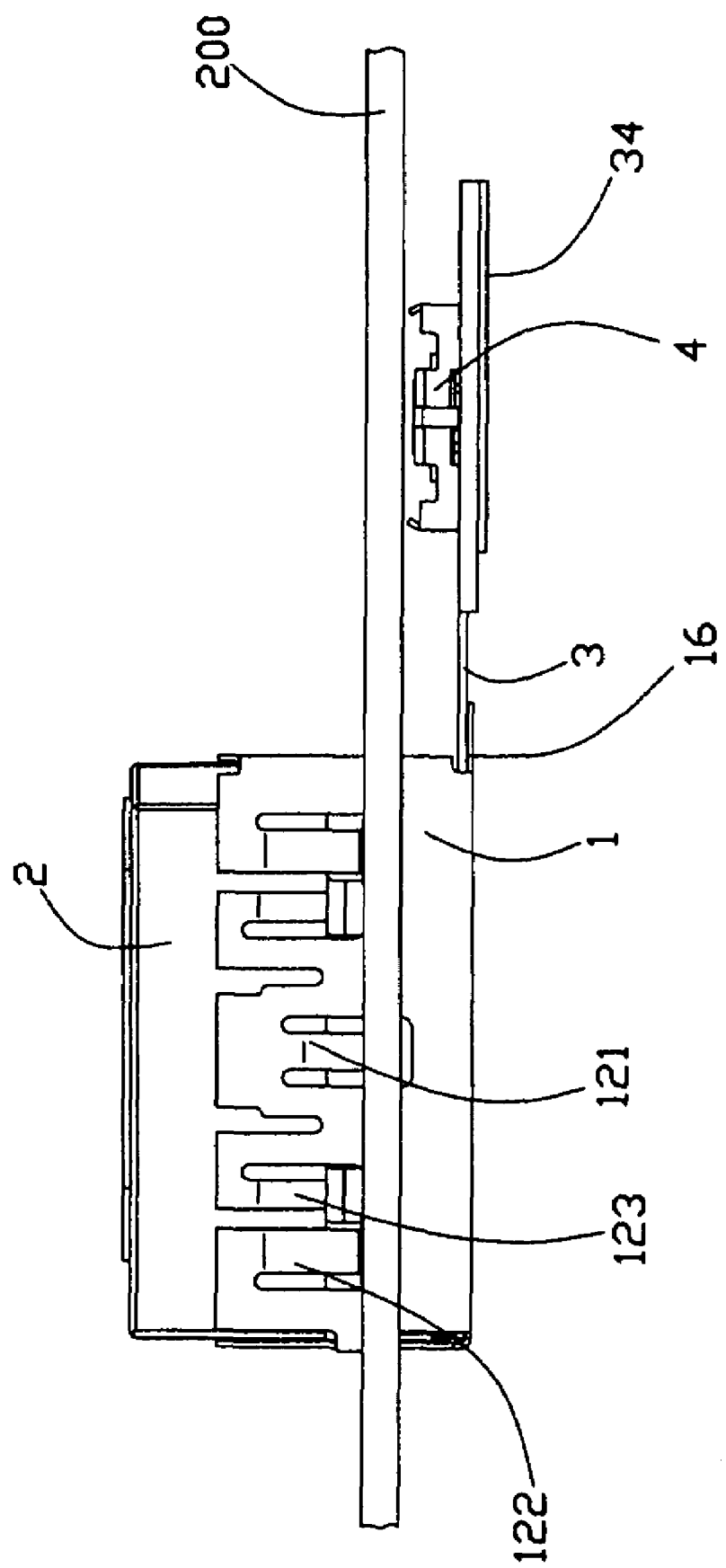
FIG. 7 is a front perspective view of FIG. 6.

As shown in FIG. 7, the extending portion 16 and a board member 34 on the FPC 3 both can enhance the intension of the FPC.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A module assembly comprising:
    a shell made of metal, having a planar bottom wall and sidewalls approximately extending from edges of the bottom wall for forming a room, the side walls at least defining arms of two types,
    a Flat Printed Circuit (FPC) having a plurality of conductive strips in one end, the one end received in the room, and
    a module body received in the room, having a plurality of conductive pads on its bottom side corresponding to the conductive strips of the FPC; wherein
    the arms of first type slant towards the room to retain the module body and the arms of second type slant outwards and away from the room; wherein
    the two types of the arms are separate and independent from each other; wherein
    the module body has ribs on side faces thereof, the arms of the first type comprise first members on each sidewall to resiliently retain the sidewalls of module body and second members bear against the ribs; wherein
    each of the second type arms defines an arc-shaped distal end; wherein
    the module body is of a box-like body, the shell has four sidewalls corresponding to the module body, the second members are disposed on each sidewall, the second type arms and the second member are disposed on two opposite sidewalls.

2. The module assembly as described in claim 1, wherein one of the sidewalls defines a gateway provided for the FPC passing through.

3. The module assembly as described in claim 2, wherein the FPC comprises a first end portion, a second end portion and a connecting portion connecting said two portion, the conductive pads are disposed on the first portion, the connecting potion with a smaller width than that of first end portion passes through the gateway.

4. The module assembly as described in claim 3, wherein the second end portion defines a board to board connector thereon.

5. The module assembly as described in claim 1, wherein the sidewalls comprise a front sidewall and a back sidewall similar to the front wall, each sidewall is divided into three portions by slots, and the two side portions each has an arm of the second type, and each portion has an arm of the first type.

6. The module assembly as described in claim 5, wherein two arms on each of the two side portion are separate from each.

7. The module assembly as described in claim 6, wherein the shell further comprises a left and right sidewalls connecting the front and back sidewalk, the front, back and left sidewalls being perpendicularly extending up from the bottom sidewall, the right sidewall extending from fringes of the front and back sidewalk and separate for forming an gateway.

8. An equipment for fitting a module assembly, comprising:
   a module assembly comprising a module body, an FPC and a metal shell having a room for receiving the module, the FPC being sandwiched between the module body and the shell, the metal shell having at least one module-locking arm slanting towards the room to retaining the module body and an assembly-locking arm slant out and away from the room;
   an insulative periphery comprising a stop portion and a fasten portion extending therefrom;
   a Printed Circuit Board (PCB) movably assembled in the insulative periphery and having an open, an assembly-receiving room corresponding to the open being formed between the insulative periphery and the PCB; wherein
   the assembly passes through the open and is accommodated in the assembly-receiving room with the assembly-locking arms pressing against the PCB beside the open; wherein
   the PCB is retained on the periphery through the fasten portion, and the stop portion and the PCB form the assembly-receiving room.

9. The equipment as described in claim 8, further comprising a resiliently washer, the washer lean again the stop portion to hold the front portion of the module body.

10. In combination,
   a printed circuit board defining opposite exterior top and bottom surfaces and an opening extending therethrough;
   a socket assembled to the printed circuit board and defining an inner contour to the printed circuit board and defining an inner contour to compliantly receive a camera module and a outer contour to the compliantly received in said opening; and
   an FPC(flat printed circuit) connected to a bottom portion of said socket; wherein
   said socket upwardly extends through said opening from the bottom surface of the printed circuit board with the FPC located under said bottom surface while most portions of said socket extending above the top surface so as to have a portion of said socket horizontally overlapped with said printed circuit board for lowering a total height of the combination; wherein
   said FPC includes a plurality of conductive strips thereon vertically aligned with the camera module for electrical connection with the camera module.

11. The combination as claimed in claim 10, said FPC is electrically connected to the printed circuit board on said bottom surface.

12. The combination as claimed in claim 11, wherein the FPC includes a first connector detachably mated with a second connector mounted on the bottom surface of the printed circuit board under a condition that both said first and second connector are horizontally distantly spaced from said opening.

13. The combination as claimed in claim 10, wherein the socket includes a bottom plate, and said FPC is located above said bottom plate.

14. The combination as claimed in claim 10, wherein said conductive strips are directly engaged with corresponding conductive pads on the camera module for said electrical connection.

* * * * *